United States Patent Office 2,957,750
Patented Oct. 25, 1960

2,957,750
DEHYDRATED SODIUM ALUMINUM PHOSPHATE COMPOSITION AND METHOD OF PRODUCING SAME

William H. Knox, Jr., Nashville, Tenn., Julian E. Blanch, Park Forest, Ill., and George P. Carroll, Nashville, Tenn., assignors to Victor Chemical Works, a corporation of Illinois No Drawing. Filed May 16, 1957, Ser. No. 659,477

3 Claims. (Cl. 23—105)

This invention relates to dehydrated sodium aluminum phosphate and the method of producing same.

Our invention contemplates the method of heating sodium aluminum phosphate essentially of the formula $$NaAl_3H_{14}(PO_4)_8 \cdot 4H_2O$$

until substantially four moles of crystal water are removed without effecting molecular dehydration. The new dehydrated product prepared by this method has improved, unexpected solubility and reaction rate characteristics, which make it an outstanding baking acid useful in preparing bakery products such as cakes, biscuits, and doughnuts.

The starting sodium aluminum phosphate material may be the pure crystalline compound described and prepared in the manner shown in U.S. Patent No. 2,550,490, or may be the batch reaction product produced by mixing suitable sodium and aluminum compounds with a concentrated phosphoric acid solution in stoichiometric proportions and heating under controlled moisture conditions until the reaction is completed yielding a reaction product having essentially the crystalline composition or empirical formula $NaAl_3H_{14}(PO_4)_8 \cdot 4H_2O$ having a free acid content of less than 1.0% and a neutralizing value (i.e., the amount by weight of sodium bicarbonate required to neutralize 100 parts by weight of the baking acid) of about 100–105.

The dehydration step may be carried out at temperatures between 80° and 200° C., preferably between 130° and 170° C. The time required will vary with the temperature employed.

For example, the new baking acid was prepared by heating milled sodium aluminum phosphate, essentially of the formula $NaAl_3H_{14}(PO_4)_8 \cdot 4H_2O$ having 0.24% free acid and a neutralizing value of 101.2 at a temperature of 150° C. until the four moles of crystal water were removed, thus producing a free-flowing powdered product having substantially the same particle sizes as the starting material. The crystal water was removed in about 2.5 hours. This acid was used in obtaining the DSAP (dehydrated sodium aluminum phosphate) data shown in the following tables.

The dehydrated sodium aluminum phosphate produced in the above manner has unusual characteristics not predictable from consideration of the simple step of removing the water of crystallization. The X-ray powder patterns of the original sodium aluminum phosphate and the dehydrated sodium aluminum phosphate product are dissimilar, thus indicating rearrangement of the crystal lattice. Such a rearrangement represents something more than the simple results of dehydration, as evidenced by the fact that upon rehydration of the dehydrated product the crystal lattice does not return to that of the original hydrated product. Table I shows the d-spacings and intensities of the original sodium aluminum phosphate (SAP), the dehydrated sodium aluminum phosphate (DSAP) and the rehydrated DSAP.

Table I

| SAP | | DSAP | | Rehydrated DSAP | |
|---|---|---|---|---|---|
| d | Intensity | d | Intensity | d | Intensity |
| A. | | A. | | A. | |
| 8.70 | 100 | 8.64 | 40 | 8.70 | 100 |
| 7.50 | 10 | 7.73 | 100 | 7.73 | 15 |
|  |  | 4.83 | 15 |  |  |
| 4.74 | 5 |  |  | 4.70 | 15 |
|  |  |  |  | 4.36 | 15 |
| 4.25 | 5 |  |  |  |  |
|  |  | 4.11 | 1 | 4.17 | 15 |
|  |  | 3.92 | 15 |  |  |
|  |  | 3.74 | 50 | 3.74 | 100 |
| 3.67 | 100 |  |  |  |  |
|  |  | 3.61 | 30 |  |  |
|  |  | 3.51 | 30 |  |  |
| 3.21 | 40 |  |  |  |  |
|  |  | 3.14 | 10 | 3.15 | 10 |
| 3.08 | 15 |  |  |  |  |
| 2.99 | 75 | 2.99 | 25 | 3.00 | 80 |
| 2.82 | 30 | 2.88 | 5 | 2.88 | 35 |
| 2.77 | 20 |  |  | 2.76 | 10 |
| 2.73 | 20 | 2.75 | 5 |  |  |
|  |  | 2.55 | 20 |  |  |
| 2.43 | 25 | 2.42 | 20 | 2.42 | 50 |
| 2.38 | 5 |  |  | 2.32 | 50 |
| 2.22 | 5 |  |  | 2.25 | 5 |
| 2.14 | 15 |  |  | 2.16 | 2 |
| 2.02 | 30 |  |  | 2.04 | 35 |
| 1.91 | 30 | 1.91 | 3 | 1.92 | 40 |
| 1.83 | 5 | 1.82 | 3 | 1.83 | 40 |

Patterns for the original SAP which had 4 moles of crystal water and the rehydrated DSAP product (rehydrated to the extent of 4 moles of water) have certain crystal similarities but show a number of lines which are significantly different, thus indicating more than an obvious change in the crystal character resulting from the dehydration step.

There is some evidence that the change in X-ray characteristics takes place when between 3 to 4 moles of crystal water are removed. The term "substantially four moles of crystal water" is intended to cover the removal of sufficient crystal water to effect a rearrangement of the crystal lattice without causing molecular dehydration, and thus requires the removal of more than 3 moles of crystal water.

Another unusual characteristic of the dehydrated sodium aluminum phosphate is its ability to dissolve in water at a much more rapid rate than the original hydrated material. For example, a 5 gram sample of the new dehydrated sodium aluminum phosphate was 90% dissolved in 100 ml. of water in ten minutes, whereas, only 35% of the original hydrated starting material was dissolved in the same time. Obviously, this indicates that the dehydrated product dissolves directly without first having to pass through a rehydration stage. This represents further evidence that the dehydrated sodium aluminum phosphate of the present invention is an unexpectedly new product.

Both the original sodium aluminum phosphate having four moles of crystal water and the new dehydrated sodium aluminum phosphate exhibit incongruent solubility in water. Hydrolysis takes place altering the composition relation between the soluble and insoluble hydrolysis products. Comparative solubility test results are shown in Table II. The data are expressed as percentages by weight of 5.0 gram test samples which are dissolved in 100 ml. of water at 21° C. in various periods of time.

The original sodium aluminum phosphate $$(NaAl_3H_{14}(PO_4)_8 \cdot 4H_2O)$$

is designated as SAP, and the dehydrated product of the present invention is designated as DSAP.

Table II

| Time, min. | SAP, Percent Soluble | DSAP, Percent Soluble |
|---|---|---|
| 5 | 23.0 | 86.0 |
| 10 | 35.0 | 90.0 |
| 20 | 50.0 | 90.0 |
| 40 | 69.0 | 90.0 |
| 60 | 77.0 | 90.0 |
| 120 | 85.0 | 90.0 |
| 180 | 87.0 | 90.0 |

When SAP and DSAP are dissolved for periods up to 240 minutes, the dissolved SAP and DSAP products chemically differ from their respective SAP and DSAP test samples. Furthermore, the dissolved SAP and DSAP products chemically differ from each other for periods up to at least 240 minutes. For example, test samples of SAP and DSAP had a $P_2O_5$ to Al ratio of 1.33 at the start of the test; however, chemical analyses of the dissolved samples showed considerable variation in the composition of the dissolved SAP and dissolved DSAP products, a variation dependent on the time the samples were in solution. This characteristic is illustrated in Table III, which shows the $P_2O_5$ to Al ratios of dissolved SAP and DSAP products after being dissolved for different periods of time.

Table III

| Time of Dissolution (min.) | Dissolved SAP, $P_2O_5$/Al Ratio | Dissolved DSAP, $P_2O_5$/Al Ratio |
|---|---|---|
| 15 | 1.99 | 2.16 |
| 60 | 1.79 | 1.86 |
| 240 | 1.66 | 1.69 |
| Theory | 1.33 | 1.33 |

The data shown in Table III indicate that both the original sodium aluminum phosphate and the new dehydrated sodium aluminum phosphate eventually approach the same composition in solution, but vary considerably, in solution, within the periods of dissolution generally encountered in the normal use of the products in the baking industry. The data in Table III also show a distinct difference in the solution composition of the DSAP product over that of the starting SAP during at least the first two-hour solution period. The higher ratio of the $P_2O_5$ to Al in the solution of the new DSAP product provides a higher proportion of available acidity for use as a baking acid in the leavening of biscuit and doughnut doughs, cake batters, and the like. Further, the more rapid rate of solution of the new DSAP product permits an increase in the initial leavening action in the dough and early stage of the baking period, thus, producing a lighter, more completely leavened baked product.

To illustrate the relative reaction rate of the new DSAP baking acid with known SAP baking acid in baking powder, mixtures were prepared by mixing the powdered baking acids with powdered sodium bicarbonate in proportions corresponding to the determined neutralizing values of the baking acids. The baking powder mixtures were reacted in water at 27° C. in amounts based on sufficient sodium bicarbonate to theoretically liberate 200 ml. of $CO_2$ gas. The total amount of $CO_2$ liberated was measured at different times intervals. The comparative reaction rates are shown in the following Table IV.

Table IV

| Time (min.) | $CO_2$ Evolved (ml.) | |
|---|---|---|
| | SAP | DSAP |
| 0 | 0 | 0 |
| 1 | 24 | 58 |
| 2 | 30 | 70 |
| 4 | 39 | 82 |
| 6 | 46 | 89 |
| 8 | 52 | 91 |
| 10 | 56 | 96 |

Similar reaction rates in doughnut dough formulations showed the rates tabulated in Table V.

Table V

| Time (min.) | $CO_2$ Evolved (ml.) | |
|---|---|---|
| | SAP | DSAP |
| 1 | 35 | 47 |
| 2 | 40 | 52 |
| 4 | 45 | 56 |
| 6 | 49 | 59 |
| 8 | 53 | 63 |
| 10 | 57 | 66 |

The high reaction rate properties of our new dehydrated sodium aluminum phosphate (DSAP) product are certainly unexpected, since one would expect comparatively low reaction rates from a dehydrated-type material.

The method we use in determining neutralizing values of baking acids is that published by the American Association of Cereal Chemists as method 5b on page 202 of Cereal Laboratory Methods, fifth edition, 1947. Typical neutralizing values for the new DSAP product generally fall within the range of 110–115, whereas corresponding values for the starting SAP product range from about 99 to 105.

The baking characteristics of the new DSAP baking acid were determined by comparative biscuit baking tests.

Two batches of self-rising flour formulations were prepared, each of which contained 100 parts by weight flour, 1.5 parts by weight sodium bicarbonate, and 2.0 parts by weight salt. Calculated amounts of SAP and DSAP for neutralizing values of 100 and 110, respectively, were then added to the different batches. Biscuit doughs were prepared by adding 12 parts by weight shortening and 66.2 parts by weight water, based on 100 parts by weight flour, to each batch. The doughs were mixed for 15 seconds in a "Hobart" dough mixer, rolled out to ⅜ inch thickness, folded double, rolled out, folded double at right angles of the first folding, and rolled out. Each of the batches were divided into 7 smaller batches, from which circular biscuit doughs were cut. The circular biscuit doughs were then placed in an oven and baked for 15 minutes at 450° F. Table VI shows the result of this test.

Table VI

| Baking Acid | Neutralizing Value | Weight of 7 Samples of Doughs, grams | Average Sp. vol. of Biscuits | Average Height of 6 Biscuits, inches | Average pH of Crumb |
|---|---|---|---|---|---|
| Original sodium aluminum phosphate (SAP) | 100 | 260 | 2.36 | 6.5 | 7.42 |
| Dehydrated sodium aluminum phosphate (DSAP) | 110 | 237 | 2.53 | 6.25 | 7.43 |

The data shown in Table VI indicate that substantially 10% more biscuits of approximately the same size can be obtained for the same weight of ingredients when using the new DSAP product.

The exact chemical composition of the new product (i.e., which results from the heat removal of approximately four moles of water from sodium aluminum phosphate having essentially the composition or the empirical formula $NaAl_3H_{14}(PO_4)_8 \cdot 4H_2O$ is not presently known. However, we have found that our dehydrated product has solubility and reaction rate characteristics which could not be expected from the simple removal of crystal water from the hydrated crystalline compound. X-ray diffraction studies show that absorption of four moles of water by the dehydrated (DSAP) product gives a crystalline product which does not exactly correspond to the original crystalline hydrate; this indicates that an unobvious change in crystal lattice results from the dehydration step.

The foregoing detailed description has been given for clearness of understanding only, and no unnecessary limitations should be understood therefrom, as modifications will be obvious to those skilled in the art.

We claim:

1. A baking acid sodium aluminum orthophosphate having the empirical formula $NaAl_3H_{14}(PO_4)_8$, said orthophosphate having 0 to 1 mole of crystal water, rearranged crystal lattice, higher proportion of available acidity, increased initial leavening action and a higher rate of solubility in water than hydrated sodium aluminum orthophosphate having the empirical formula $NaAl_3H_{14}(PO_4)_8 \cdot 4H_2O$.

2. The method of producing dehydrated sodium aluminum orthophosphate which comprises heating sodium aluminum orthophosphate of the empirical formula $NaAl_3H_{14}(PO_4)_8 \cdot 4H_2O$ at about 80–200° C. until substantially 4 moles of crystal water are removed without effecting molecular dehydration to produce a dehydrated orthophosphate product having 0 to 1 mole of crystal water, rearranged crystal lattice, higher proportion of available acidity, increased initial leavening action and a higher rate of solubility in water than hydrated sodium aluminum orthophosphate having the empirical formula $NaAl_3H_{14}(PO_4)_8 \cdot 4H_2O$.

3. The method of claim 2 wherein $$NaAl_3H_{14}(PO_4)_8 \cdot 4H_2O$$

is heated at about 130–170° C.

References Cited in the file of this patent
UNITED STATES PATENTS

| | | |
|---|---|---|
| 2,538,867 | Gregar | Jan. 23, 1951 |
| 2,550,490 | McDonald | Apr. 24, 1951 |

OTHER REFERENCES

Inorganic Chemistry, Hinds, 2d ed., John Wiley and Sons, 1909, pages 74, 75, 93.